Patented June 25, 1929.

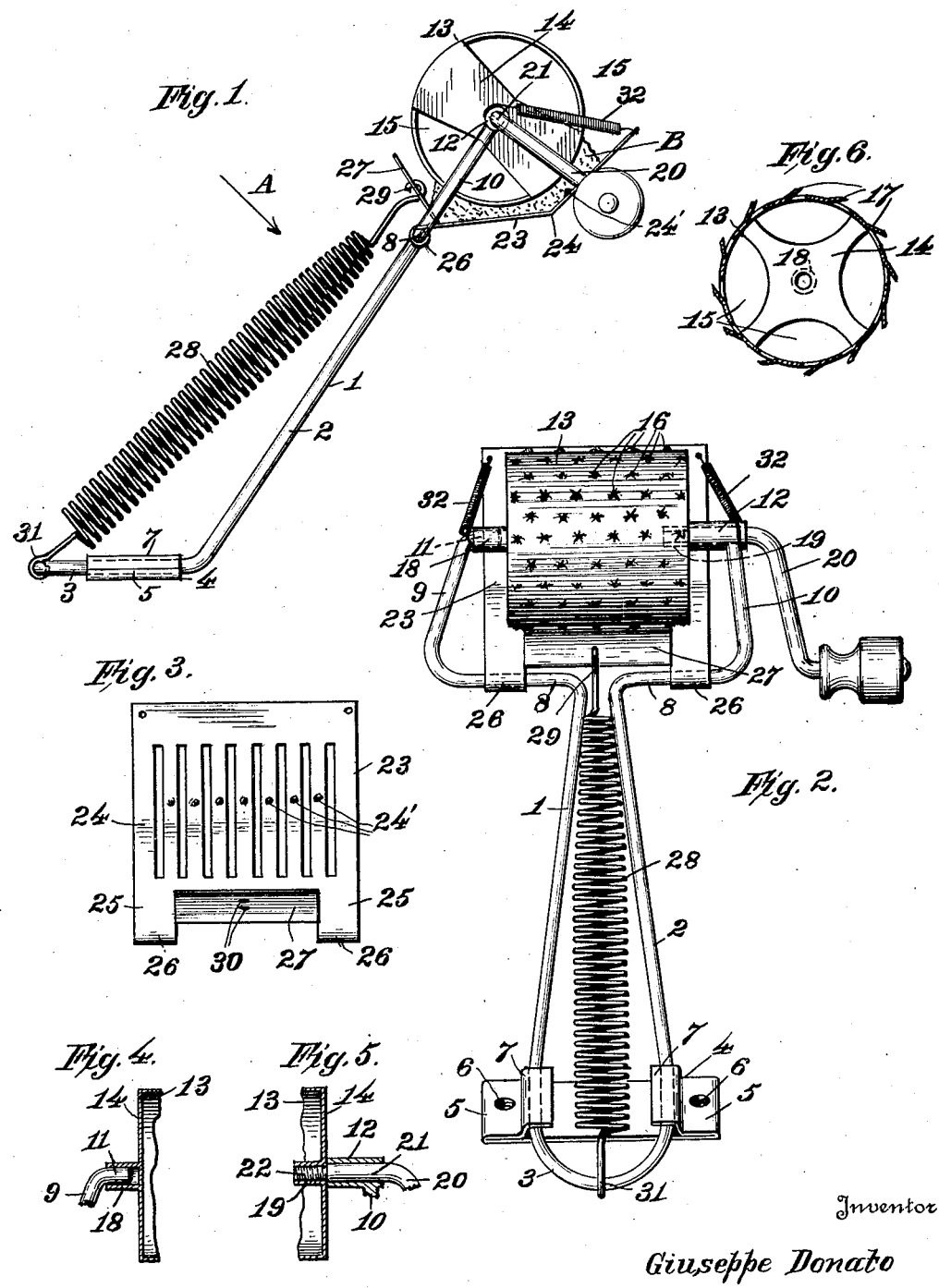

1,718,220

UNITED STATES PATENT OFFICE.

GIUSEPPE DONATO, OF PHILADELPHIA, PENNSYLVANIA.

CULINARY DISINTEGRATOR.

Application filed May 20, 1927. Serial No. 192,992.

My invention relates to culinary disintegrators; that is, to devices for grating cheese, bread or the like, or for cutting vegetables or other foodstuff.

The object of my invention is to provide a device of the class mentioned in which the material is automatically fed to the disintegrating element. A further object of my invention is to provide a device of the class mentioned which may be held in the hands while using, or supported in a suitable bracket. A further object of my invention is to provide a culinary disintegrator in which the disintegrating element may be readily removed and replaced by another for coarse or finer work, or to change the device from a grater to a slicer, or vice versa. A further object is to provide a device of the class mentioned of such construction that the material will not become packed on the surface of the disintegrating element. A further object is to provide a device as mentioned which will substantially completely grind the material without waste. Further objects of my invention are to provide a device as mentioned which shall be of comparatively low cost to manufacture, one which will not readily get out of order, and one which may be readily cleaned after use. Other objects will appear hereinafter.

With these objects in view my invention consists generally in a rotary disintegrating element mounted upon a suitable support, a follower for holding the material in engagement with the disintegrator and means for yieldingly forcing the follower toward the disintegrator. My invention further consists in a device as mentioned in which the follower comprises a foraminated plate. My invention further consists in a device of the class mentioned comprising a support and a rotary disintegrating element mounted thereon, a follower plate hingedly mounted upon the support and means for yieldingly forcing said follower plate toward the rotary element. My invention further consists in providing an unenclosed disintegrating element, to the end that the material shall not become packed on the face of the same. My invention further consists in a device as mentioned in which the disintegrator element may be readily removed and replaced. My invention further consists in various details of construction and arrangements of parts all as will be fully described hereinafter and particularly pointed out in the claims.

My invention will be more readily understood by reference to the accompanying drawings forming a part of this specification and in which—

Figure 1 is a side elevation of a culinary disintegrator embodying my invention, illustrating the same supported in a suitable bracket.

Fig. 2 is an elevation of the same looking in the direction of the arrow A of Fig. 1, Fig. 3 is a detail view of the follower plate, Fig. 4 is a detail section illustrating the manner of removably mounting one end of the rotary element, Fig. 5 is a similar view, illustrating the means for removably mounting the opposite end of the rotary element, and Fig. 6 is a transverse section through a rotary cutter element.

Referring now to the drawings 1 indicates the support which is preferably formed of a suitable length of heavy wire or rod bent substantially centrally upon itself to form a main portion or standard 2, which may be utilized as a handle for holding the device when desired. The outer end is bent at an angle forming a base 3, which is adapted to be slid into engagement with a bracket 4 when it is desired to fixedly support the device for use. This bracket may be of any preferred form, and may be constructed of a single strip of metal, as illustrated, with its ends bent back upon itself forming attaching lugs 5, which are perforated as at 6 to receive the fastening means, and then bent upwardly and inwardly forming tongues under which the base 3 may be slid.

At the opposite end of the standard portion of the support the rod is bent outwardly on each side into portions 8 in alinement with each other and at substantially right angles to the axis of the standard. The ends of the rod are bent forwardly as at 9 and 10 terminating in suitable bearings for the rotary disintegrator hereinafter described. The extreme end of the portion 9 is turned inwardly forming a gudgeon 11, which constitutes one of the above mentioned bearings. On the portion 10, the bearing constitutes a sleeve 12, as shown clearly in Figs. 2 and 5.

The rotary disintegrating element comprises a cylindrical member 13, preferably formed of sheet metal and having suitable end members 14, which may be of any form to support the hub members and provide apertures 15 for the passage of the material which enters the cylinder during a disintegrating process. The surface of the cylinder is suitably formed to produce the desired operation upon the foodstuff. For grating, the cylinder may be roughened in any ordinary manner, as indicated at 16 in Fig. 2, or may be formed with suitable longitudinally disposed knives 17, which may be struck outwardly from the material of the cylinder, as illustrated in Fig. 6. At one end, the cylinder is provided with an outwardly projecting hollow hub 18 to removably receive the gudgeon 11. The opposite end of the cylinder is provided with an inwardly projecting hub 19, which is internally threaded for a purpose hereinafter described. 20 indicates a crank for operating the rotary disintegrator 13. This crank has a bearing 21 in the sleeve 12 and terminates in a threaded end 22, which threads into the hub 19. This construction provides means whereby the rotary disintegrator element 13 may be readily removed from the device for cleaning or for replacement by another disintegrator for a different grade or character of work. That is, a coarser or finer grater may be substituted or a cutter such as illustrated in Fig. 6 may be substituted for the grater, or vice versa. To remove the element 13 it is but necessary to unscrew the crank 20 by turning the same in the reverse direction from its direction of operation, and then springing the gudgeon 11 out of the hub 18, which may be readily done owing to the resiliency of the support. The member is replaced by slipping the hub 18 over the gudgeon 11 and then screwing the crank into engagement with the hub 19.

23 indicates a follower for forcing the material to be operated upon into engagement with the rotary disintegrator. This follower preferably comprises a foraminated plate bent transversely as at 24; making the follower slightly concave to hold the material to be operated upon. Projections 24' are provided on the face of the plate 24 to assist in firmly holding the material. The plate is preferably pivotally or hingedly mounted upon the support, and to this end it is provided with a pair of lugs 25 terminating in sleeves 26, which hingedly engage the portions 8 of the support. The portion of the material of the plate between the lugs 25 is bent upwardly forming an apron 27, which in a large measure catches the matter disintegrated from the material to prevent it from scattering. This apron 27 also constitutes a lever to which a spring 28 is attached for yieldingly forcing the follower toward the rotary element. One end of the spring is provided with a hook 29 which engages in perforations 30 in the apron 27 and the other end of the spring is preferably attached to the base of the support as at 31. 32 indicates auxiliary springs for assisting in yieldingly forcing the follower toward the rotary element. These are attached at one end to the outer free ends of the follower plate and have their opposite ends attached to the support adjacent the bearings for the rotary member.

In operating the device, the follower 23 is manually disposed and the material B is placed thereon and the follower released. The spring 28, assisted by the springs 32, force the material B against the rotary disintegrator 13. Rotation of the disintegrator by means of the crank 20 will then grate or cut the material B according to the style of the disintegrator that has been placed in the support. The manner of interchanging the members 13 has been described hereinbefore and needs no further description.

I claim:

1. A device of the class described comprising a support, a rotary disintegrator mounted thereon, a concave follower plate pivotally mounted on said support, means for yieldingly forcing said follower plate toward said rotary disintegrator, and an apron projecting upwardly from said follower plate adjacent the hingedly mounted end thereof substantially as described.

2. A device of the class described comprising a support, a rotary disintegrator element mounted at one end thereof, a follower plate hingedly mounted on said support adjacent said rotary element, an apron extending upwardly from said follower plate adjacent the hingedly mounted end and a tension spring having one end attached to said apron and the other end attached to said support, substantially as described.

3. A device as set forth in claim 2 in combination with auxiliary means for forcing the outer end of the follower plate toward the rotary element, substantially as described.

4. A device of the class described comprising a support formed of a rod bent substantially centrally upon itself to constitute a standard, the portions of said rod beyond the standard being bent outwardly in alinement with each other and then forwardly, bearings at the ends of the last said portions, a disintegrator removably mounted in said bearings, a follower plate pivotally mounted on the outwardly bent portions of the rod and means for yieldingly forcing said follower plate towards said disintegrator, substantially as described.

5. A device as set forth in claim 4 in which the standard at the end opposite the disintegrator is bent at an angle to form a base portion, in combination with a bracket adapted to receive said base portion to removably support the device, substantially as described.

In testimony whereof I have signed my name to this specification.

GIUSEPPE DONATO.